United States Patent

Wolf et al.

[11] Patent Number: 5,768,970
[45] Date of Patent: Jun. 23, 1998

[54] ULTRASONIC CUTTING SYSTEM

[75] Inventors: Karl-Heinz Wolf, Halle; Hartmut Grosse, Nauendorf/Saalkreis; Lothar Gebhardt, Halle; Christian Roth, Halle; Thomas Schröter, Halle; Hans Schröder, Halle, all of Germany

[73] Assignee: Dr. Wolf & Partner, Ingenieurbuero fuer Lebensmitteltechnik GmbH., Halle, Germany

[21] Appl. No.: 728,494

[22] Filed: Oct. 9, 1996

[30] Foreign Application Priority Data

Oct. 11, 1995 [DE] Germany .................. 195 37 826.1

[51] Int. Cl.⁶ .................................................. B26D 1/45
[52] U.S. Cl. .............................................. 83/701; 83/956
[58] Field of Search .................... 83/701, 956; 451/165; 74/155

[56] References Cited

U.S. PATENT DOCUMENTS 4,409,659  10/1983  Devine ................................. 83/701
5,163,865  11/1992  Smith ................................... 83/956
5,228,372   7/1993  Harrop et al. ........................ 83/701
5,437,215   8/1995  Hamilton .............................. 83/956

FOREIGN PATENT DOCUMENTS

| 0 584 670 | 3/1994 | European Pat. Off. | B26D 7/08 |
| 2625636 | 12/1977 | Germany | B26D 1/06 |
| 3437908 | 5/1985 | Germany | B26D 7/08 |
| 3626426 | 2/1987 | Germany | B26D 7/08 |
| 3920671 | 12/1989 | Germany | B26F 3/00 |
| 4210928 | 10/1993 | Germany | B24B 33/08 |

Primary Examiner—Maurina T. Rachuba
Attorney, Agent, or Firm—Karl Hormann

[57] ABSTRACT

An ultrasonically vibrating and mechanically reciprocating elongate cutting member provided with individual ultrasonic transducers at opposite ends thereof, the transducers being each connected to amplitude amplifiers and to a common ultrasonic generator connected to controls responsive to the reciprocating movement of the cutting member.

17 Claims, 3 Drawing Sheets

ULTRASONIC CUTTING SYSTEM

BACKGROUND OF THE INVENTION

1. Field of the Invention

The invention, in general, relates to an ultrasonic cutting system and, more particularly, to an ultrasonically energized cutting knife with superimposed mechanical cutting movement.

2. Background of the Invention

Ultrasonically energized cutting blades and other kinds of cutting tools, and their use for cutting and otherwise treating different materials and substances, are well known in the art.

Thus, German patent 4,210,928 discloses an ultrasonically energized honing tool in which the honing tool has a free-standing or cantilevered member the length of which is fixed in relation to the ultrasonic vibrations and which is provided with a layer of a cutting medium, the honing tool being suitable for surface treatments as well as for correcting the shape of bores, for obtaining improved shape adjustments or an increased efficiency in the removal of material.

German patent specifications 3,626,426 and 3,920,671 relate to ultrasonic cutting devices for use in cutting cardboard and glass.

In the known cutting devices, the blades are arranged in the axis of vibration of the ultrasonic transducers, and they are energized accordingly. The ultrasonic waves fed into the cutting blades have wave antinodes and nodes resulting, because of compression and expansion processes in the area of the antinodes, in very small movements of the blade which augment any cutting operation. Since these movements augment the cutting operation only in the area of the wave antinodes, it is necessary for the cutting of thick materials, to introduce long-stroke reciprocal movement into a blade of greater or lesser length.

Reference is made to German patent specification 3,437,908.

Another possibility is described in European patent specification 0,584,670 where a plurality of blades are caused to vibrate normal to the axis of vibration by an ultrasonic transducer by way of an ultrasonic horn.

Reference may also be had to German patent specification 2,625,636 relating to a method of chipless cutting of solid materials and in which a cutting element is used which is energized by ultrasonics. While the specification states that a slowly moving and standing wave is to be generated, it neither discloses a method of generating such a wave nor ways of ensuring a cutting action. Nothing discloses any technical elements for the realization, so that there is no enabling disclosure.

The known solutions suffer from the disadvantages that in the cutting element a standing wave is generated which cannot provide a high-quality cut and, furthermore, the lengths of the blades or cutting tools are limited. The dimensions mentioned in the prior art are stated to be about 120 mm. They are, therefore, not suitable for cutting thick materials such as large pieces of meat and large loaves or wheels of cheese.

OBJECTS OF THE INVENTION

Accordingly, it is an object of the invention to provide an ultrasonically energized cutting system of the kind useful for cutting food stuffs.

A more particular object is to provide an ultrasonically energized cutting system which makes it possible to use long cutting blades or cutting tools.

Another object is to provide an ultrasonically energized cutting system provided with an electronic control for adjusting the cutting action as a function of the material being cut.

Yet another object is to provide an ultrasonic cutting system which prevents the build-up of a standing wave.

Other objects will in part be obvious and will in part appear hereinafter.

BRIEF SUMMARY OF THE INVENTION

In the accomplishment of these and other objects the invention, in a currently preferred embodiment thereof, provides for a cutting system of the kind particularly useful for cutting food stocks and including a cutting member vibrating as a result of ultrasonic energization and having a mechanical reciprocating movement superimposed thereon. Advantageously, the cutting member is mounted on an arcuate member at each end of which there is provided an ultrasonic transducer for introducing ultrasonic energy into the cutting member from opposite ends thereof. A drive member connected to the arcuate member is provided to impart reciprocating mechanical movement to the cutting member by way of the arcuate member. The ultrasonic transducers are preferably modulated in such a way that the ensuing vibrations of the cutting member are substantially shorter than the ultrasonic waves. The ultrasonic transducers are preferably provided with flanged amplitude amplifiers.

BRIEF DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the ensuing description of a currently preferred embodiment, when read in conjunction with the appended drawings, in which:

DETAILED DESCRIPTION OF THE PREFERRED EMBODIMENT

Figure 1:
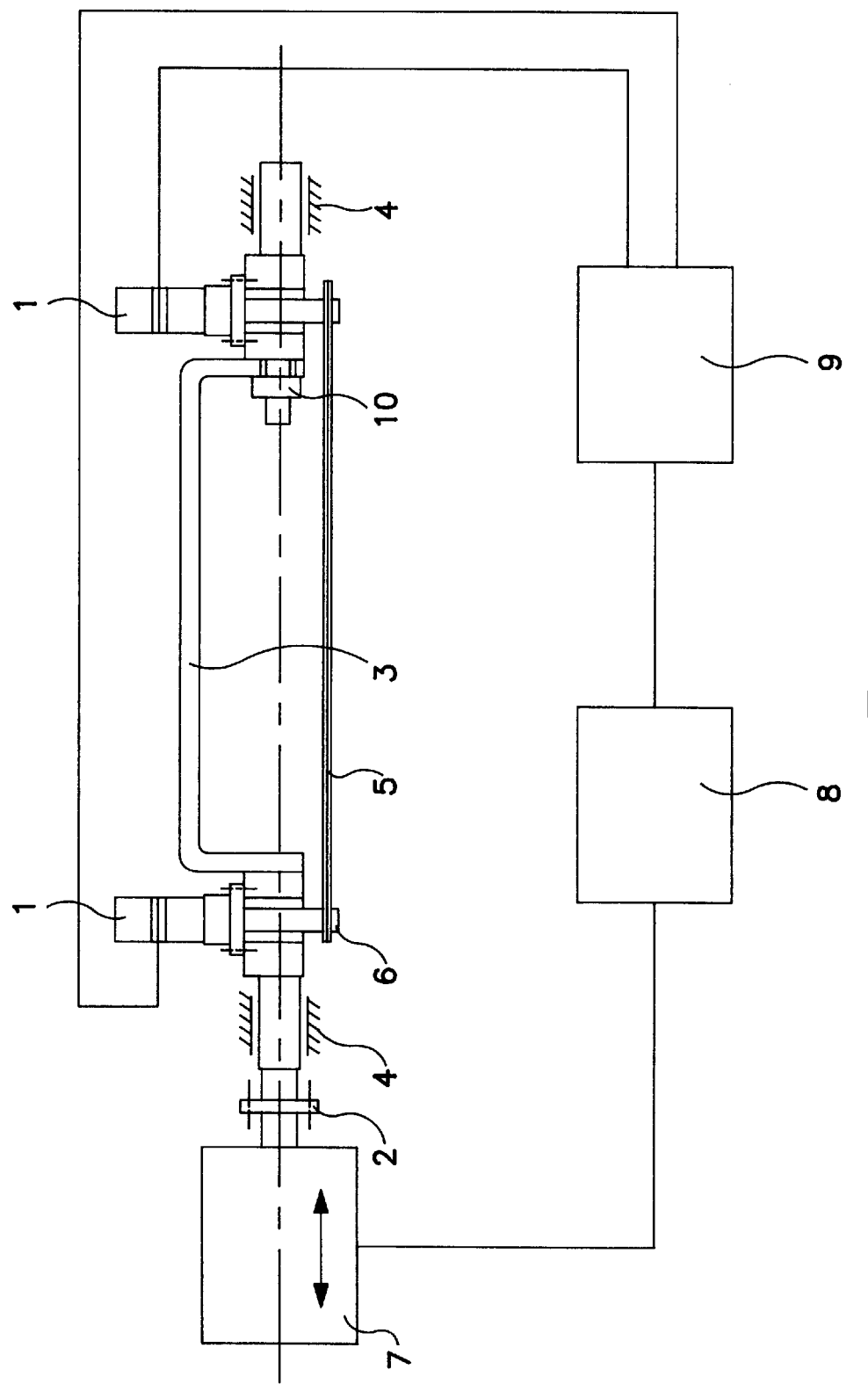
FIG. 1 is a schematic presentation of the complete cutting system in accordance with the invention.

The nature of the invention is depicted by the schematic presentation of FIG. 1 of the complete cutting system. The cutting tool, shown to be an elongate knife 5, is mounted at both of its ends to an arcuate member 3 by appropriate fasteners 6.

The arcuate member 3 is itself supported by appropriate bearings 4. At one of its ends the arcuate member 3 is connected, by way of a clutch 2, to a drive 7 for imparting longitudinal, i.e. reciprocating, movement to the member 3. At its opposite end, the arcuate member is provided with a tensioning member or chuck 10.

Figure 3:
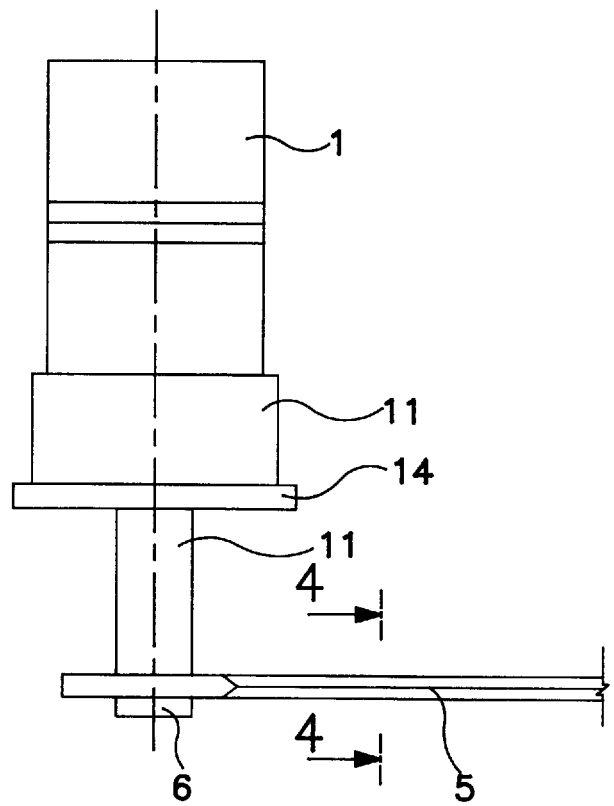
FIG. 3 is a detail taken from FIG. 3.

Also mounted on the arcuate member, adjacent to each of the mounts of the knife 5, are ultrasonic transducers 1 each comprising piezo ceramics and associated terminal masses tuned to half the wave length of the ultrasonic frequency. Each of the ultrasonic transducers 1 is connected to an amplitude amplifier 11 by way of a central connection. The amplification of the amplifier 11 is determined by its geometric configuration which, as shown in FIG. 3, is a stepped cylinder 11.

FIG. 1 also shows a control 8 which is connected to both ultrasonic transducers 1 by way of an ultrasonic generator 9 as well as to the longitudinal drive 7.

The mounted knife 5 is a cutting tool having a preferred length from about 300 to about 500 mm and is mounted transversely of the axis of vibration of the ultrasonic transducers 1. It is connected by fasteners 6 in such a manner that the ultrasonic waves are conducted from the transducers 1 into the knife 5.

The chuck 10 at the arcuate member 3 is provided to ensure that the knife 5 is mounted tautly between the ultrasonic transducers 1.

The ultrasonic transducers 1 are energized by an ultrasonic generator 9. Both transducers 1 are energized at the same amplitude and the same frequency. It is, however, possible and within the ambit of the present invention to vary the phase positions of the excitation voltages of the ultrasonic transducers 1 relative to each other.

The cutting system provides for a drive which enables high speed cutting operations, preferably of raw materials in the food industry and which by way of its electronic control 9 is capable of adjusting the technical parameters of the drive to the properties of the raw material during a cutting operation.

In this context, essential technical parameters are, among others, the cutting speed in dependence of the amplitude of the vibrations generated by the ultrasonic transducers as well as the frequency and stroke of the longitudinal movement. The cutting force may also be adjusted during the advance movement.

Such technological parameters as density, viscosity, structure and temperature are directly affected in connection with the advance movement of the material to be cut.

The control 8 also serves to conduct the cutting operation under optimal conditions, with the main phases of each cutting operation, i.e., 1. penetration of the cutting tool into the material to be cut,
2. cutting through the material,
3. exiting from the material to be cut; being affected in such a way that during the initial cutting phase a low advancing force is acting at a high cutting speed, whereas advancing force and cutting speed are set uniformly during the second phase, while advancing force and cutting speed are both reduced during the third phase.

During a cutting operation the knife 5 is set into high frequency vibrations by the ultrasonic transducers. The vibrations partially act in the blade, and a translatory movement is additionally superimposed on the vibrating system, by the longitudinal drive 7. This, in turn, results in a substantial increase in the speed of the knife relative to the material to be cut.

Figure 2:
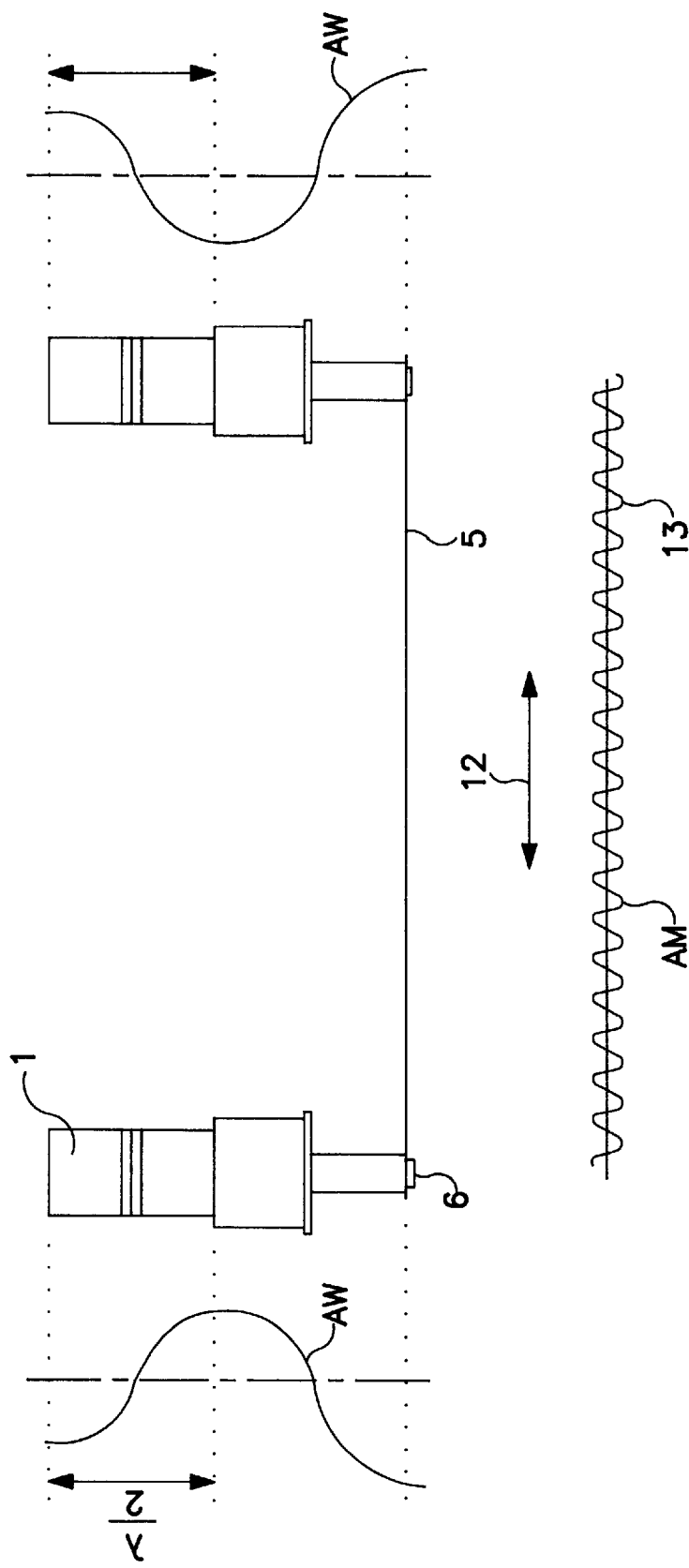
FIG. 2 depicts the association of the ultrasonic transducers relative to the cutting member, including the amplitude response.

FIG. 2 schematically depicts the arrangement and the functional cooperation of the knife 5 with the ultrasonic transducers 1 and the amplitude amplifiers 11 arranged between the ultrasonic transducers 1 and the knife 5.

The arrow 12 indicates the reciprocal longitudinal movement of the entire cutting device. The amplitude curves 13 present the vibratory pattern in the knife 5.

It may thus be seen that vibrations are induced in the knife 5 in dependence of the geometry and the properties of the materials. The wavelengths of the vibrations are substantially shorter than the wavelengths of the exciting ultrasonic vibrations.

FIG. 3 depicts the structural arrangement of the ultrasonic transducers 1 in connection with the amplitude amplifier 11 and the way in which they are connected to the arcuate member 3, as well as the connection with the knife 5.

In this embodiment an amplitude amplifier 11 is directly mounted on each of the ultrasonic transducers. The amplification of the amplifier 11 is determined by its configuration which in the present example is shown to be a stepped cylinder. At the position of the cross-sectional reduction, the stepped cylinder is provided with a flange 14 by means of which the corresponding ultrasonic transducer 1 and amplitude amplifier 11 are connected to the arcuate member 3.

In this connection, it is important to position the flange 14 at a zero passage of the vibration to prevent transmittal of vibrations to the arcuate member 3.

Figure 4:
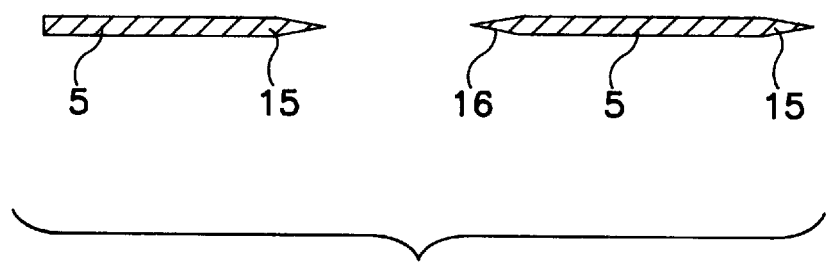
FIG. 4 is a section along line A—A of FIG. 3.

An advantageous configuration of the knife 5 is shown in FIG. 4 which depicts alternative cross-sectional configurations of the knife 5 with one and two cutting edges 15 and 16, respectively.

The narrow configuration of the knife 5 results in a substantially smaller surface area relative to conventional circular knives. This results in the advantages that the knives may be cleaned more easily, that greasing effects during a cutting operation are reduced, that friction and warming of material are reduced which, in turn, results in a reduced bacterial exposure of the surface of the material to be cut. Self-cleaning action is, in fact, induced in the knife.

The proposed novel cutting system relates to an oscillating cutting system operating in a straight line for cutting of food stuffs, in particular. It may also be used, however, for cutting and severing other products. Particularly for cutting food stuffs, such as meats and cold cuts, as well as vegetables, cheese and baked goods in a fresh and refined condition, the novel system provides for quality precision cuts. Its also satisfies the high sanitary or hygienic requirements. On the basis of its double action, the cutting system with the long-stroke controlled drawing movement of the knife 5 by means of the controlled ultrasonic transducers 1, provides for a high speed cutting system with knife movements of about 5 to 500 Hz and an amplitude of about 10 to 30 mm. Ultrasonic micro cutting operations are thus possible in the product to be worked upon.

It will thus be seen that an ultrasonically energized cutting system is provided with an additional mechanically generated translatory movement superimposed upon it. The double-acting cutting system is characterized by a long-stroke controlled oscillation of a cutting blade and is provided with a controlled ultrasonic generator for the cutting tool.

A high speed cutting system has thus been provided which allows the blade to be moved at about 5 to 50 Hz at an amplitude of about 10 to about 30 mm and which affects an ultrasonic micro cutting operation in the product to be cut.

In the context of the novel cutting system due recognition was given to the fact that in the conventional ultrasonic frequency range of 20 to 50 kHz and with materials used for making cutting blades, the spacing between generated wave antinodes and, hence, the spacing between amplitude maximum values lies between about 15 cm and 6 cm. This means that in the range of the maximum cutting is substantially augmented and that for cutting thick products the knife or the blade must be moved at a long-stroke movement similar to the thickness of the material to be cut but at the most at half the wave length of the ultrasonic waves.

The cutting tool in the cutting system in accordance with the invention is a long knife having a preferred length of about 300 to 500 mm. The knife is arrange transversely of the axis of vibration of the ultrasonic transducer and is mounted at both ends by means of appropriate fasteners. At each end of the knife, there is provided an ultrasonic transducer, each comprising piezo ceramics and associated terminal masses tuned to half the wave length of the excitation frequency. An amplitude amplifier is provided connected by a central connection. The amplification effect of the amplifier is a function of its geometric configuration.

Both ultrasonic transducers are excited at the same amplitude and the same frequency by an ultrasonic generator. It is possible, however, to vary the phase position of the excitation voltages relative to each other.

By feeding ultrasonic vibrations from both ends of the cutting member and because of the sound wave reflection at both ends of the knife a multiple superposition of the wave will occur. In this manner wave antinodes do not occur solely at a spacing of half a wave length. Rather, wave antinodes occur throughout the entire length of the knife, that causing ultrasonic activation of the entire blade.

At the same time, vibrations arise which are effective transversely of the effective line of the blade and provide for a free cut.

It will thus be seen that the novel cutting system in accordance with the invention offers a significant improvement over prior art devices of its kind.

What is claimed is:

1. A cutting system, comprising:
   a substantially straight elongate cutting member;
   elongate arcuate means having first and second ends for mounting opposite ends of the cutting member therebetween;
   transducer means mounted adjacent to each of the first and second ends and operatively connected therewith for inducing in the cutting member vibrations of a predetermined wavelength by ultrasonic energy;
   means for controlling the transducer means such that the predetermined wavelength of the vibrations is shorter than the wavelength of the ultrasonic energy;
   drive means connected to one of the first and second ends for imparting reciprocating mechanical movements to the cutting member.

2. The system of claim 1, wherein the transducer means comprises amplitude amplification means.

3. The system of claim 2, wherein the amplification means is provided with flange means.

4. The system of claim 3, wherein the transducer means and the amplification means are connected to the arcuate means by the flange means adjacent to the first and second ends thereof.

5. The system of claim 4, wherein the amplification means comprises stepped cylinder means.

6. The system of claim 5, wherein the amplification effect of the amplification means is a function of the geometrical configuration thereof.

7. The system of claim 6, wherein the geometrical configuration of the amplification means is a function of the cutting member.

8. The system of claim 2, wherein the transducer means is connected to ultrasonic generating means.

9. The system of claim 8, wherein the ultrasonic generating means is connected to control means responsive to the drive means.

10. The system of claim 1, wherein the drive means is connected to one of the first and second ends by clutch means.

11. The system of claim 1, wherein the cutting member has a length of from about 300 mm to about 500 mm.

12. The system of claim 11, wherein the cutting member is provided with a single cutting edge.

13. The system of claim 11, wherein the cutting member is provided with a dual cutting edge.

14. The system of claim 9, wherein the control means causes the cutting member to vibrate at frequencies from about 5 Hz to about 500 Hz.

15. The system of claim 14, wherein the cutting member vibrates at amplitudes between about 10 mm and about 30 mm.

16. The system of claim 9, wherein the control means is response to the drive means.

17. The system of claim 1, wherein means is provided at the other of the first and second ends for mounting the cutting means tautly.

* * * * *